United States Patent [19]

Kazaoka et al.

[11] Patent Number: 4,463,626
[45] Date of Patent: Aug. 7, 1984

[54] TILTABLE STEERING APPARATUS FOR VEHICLES

[75] Inventors: Kenichi Kazaoka, Nagoya; Teiji Okuyama, Toyota; Masumi Nishikawa, Toyoake, all of Japan

[73] Assignee: Aisin Seiki Kabushiki Kaisha, Kariya, Japan

[21] Appl. No.: 358,586

[22] Filed: Mar. 16, 1982

[30] Foreign Application Priority Data

Mar. 20, 1981 [JP] Japan .................................. 56-40690

[51] Int. Cl.³ .............................................. B62D 1/18
[52] U.S. Cl. ...................................... 74/493; 74/536; 280/775; 180/78
[58] Field of Search .................. 74/493, 533, 535, 536, 74/555; 280/775; 180/78

[56] References Cited

U.S. PATENT DOCUMENTS

| | | | |
|---|---|---|---|
| 2,985,032 | 5/1961 | Schroeder et al. | 74/536 |
| 3,302,478 | 2/1967 | Pauwels | 180/78 |
| 3,355,962 | 12/1967 | Gerdes et al. | 280/775 |
| 3,365,976 | 1/1968 | Reed et al. | 74/493 |
| 4,335,625 | 6/1982 | Nishikawa | 74/493 |

FOREIGN PATENT DOCUMENTS 154365 11/1981 Japan ..................................... 74/493

Primary Examiner—Kenneth Dorner
Assistant Examiner—Anthony W. Raskob, Jr.
Attorney, Agent, or Firm—Oblon, Fisher, Spivak, McClelland & Maier

[57] ABSTRACT

A tiltable steering apparatus for vehicles for tiltably regulating a steering wheel by engagement of a pawl member and a latch member according to operation of an operating lever which includes a memory member engaged with the latch member and releasable from the latch member upon engagement of the latch member with the pawl member and engageable with the latch member upon disengagement of the latch member from the pawl member according to rotation of the operating lever, a regulating member engageable with the pawl member and disengageable from the pawl member for locating a relative angled position of the pawl member and memory member at the same position thereof so as to engage the pawl member with the latch member and a mechanism for acting on the memory member for locating the relative angled position of the pawl member and the memory member at the same position thereof.

5 Claims, 7 Drawing Figures

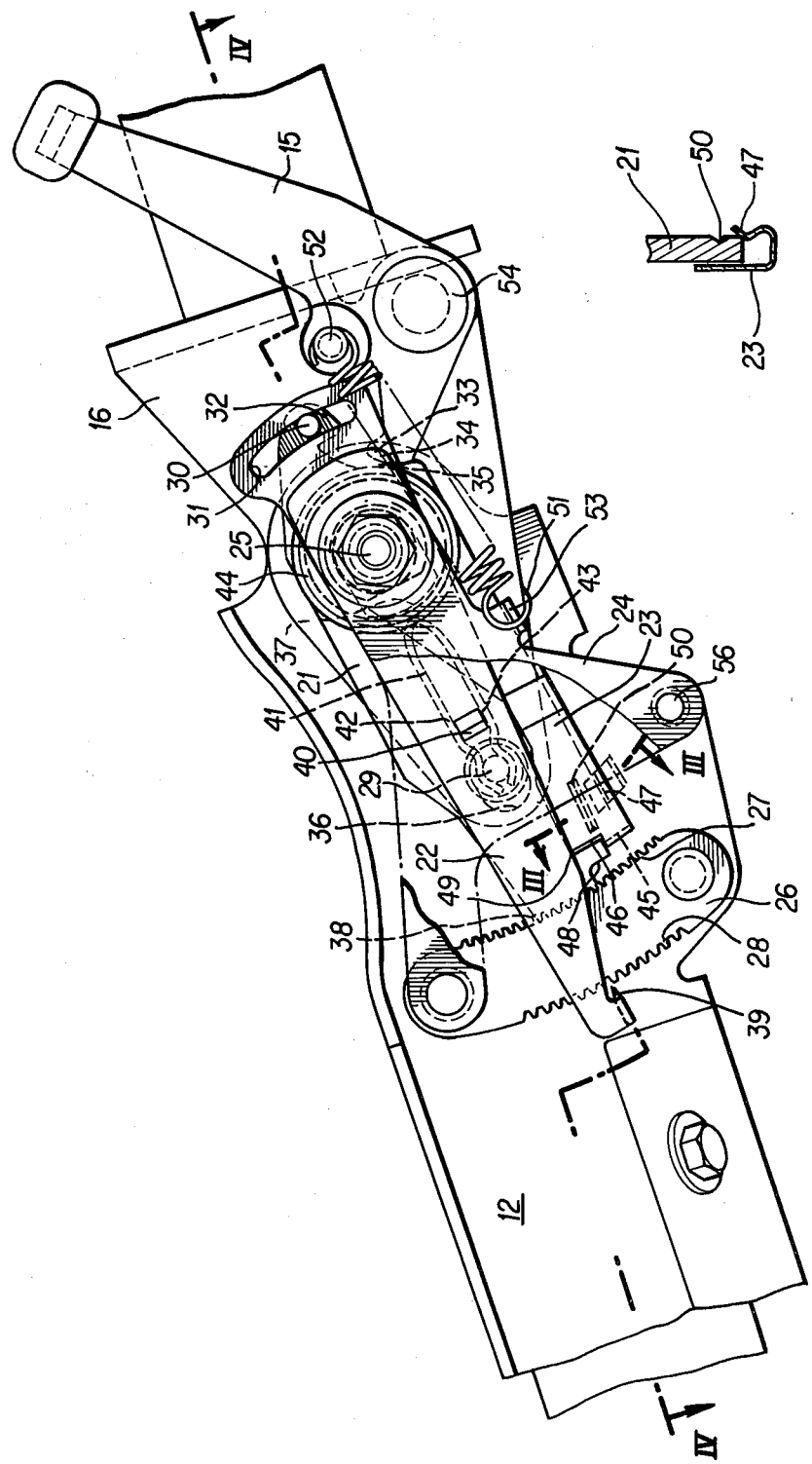

TILTABLE STEERING APPARATUS FOR VEHICLES

BACKGROUND OF THE INVENTION

1. Field of the Invention

The present invention relates to a tiltable steering apparatus and, more particularly, to a tiltable steering apparatus for vehicles.

2. Description of the Prior Art

In a conventional tiltable steering apparatus for vehicles a steering shaft is tiltably regulated in the upward and downward direction within a vehicle passenger compartment according to the operation of an operating handle, thereby obtaining a desired driving position of a driver, and tilt-away operation is attained for easily getting in and out. However, the tilted position before the tilt-away operation is not retained after the tilt-away operation is completed, and the operating handle must again be operated.

SUMMARY OF THE INVENTION

An object of the present invention is to provide an improved tiltable steering apparatus for vehicles which obviates the aforementioned drawbacks of the described conventional tiltable steering apparatus.

A further object of the present invention is to provide an improved tiltable steering apparatus for vehicles which can reliably moved.

A still further object of this invention is to provide an improved tiltable steering apparatus for vehicles which is relatively simple structurally and includes a minimum number of parts.

In accordance with the present invention, a tiltable steering apparatus for vehicles is provided for tiltably regulating a steering wheel by engagement of a pawl member and a latch member according to operation of an operating lever which includes a memory member engaged with the latch member and releasable from the latch member upon engagement of the latch member with the pawl member and engageable with the latch member upon disengagement of the latch member from the pawl member according to rotation of the operating lever, a regulating member engageable with the pawl member and disengageable from the pawl member for locating a relative angled position of the pawl member and memory member at the same position thereof so as to engage the pawl member with the latch member and a mechanism for acting on the memory member for locating the relative angled position of the pawl member and the memory member at the same position thereof.

BRIEF DESCRIPTION OF THE DRAWINGS

Various other features, objects and attendant advantages of the present invention will become self-evident when considered in connection with the accompanying drawings wherein:

FIG. 2 is a similar view of FIG. 1 and shows the interior of a column portion;

FIG. 3 is a sectional view taken along line III—III in FIG. 2;

DETAILED DESCRIPTION OF THE PREFERRED EMBODIMENT

Figure 1:
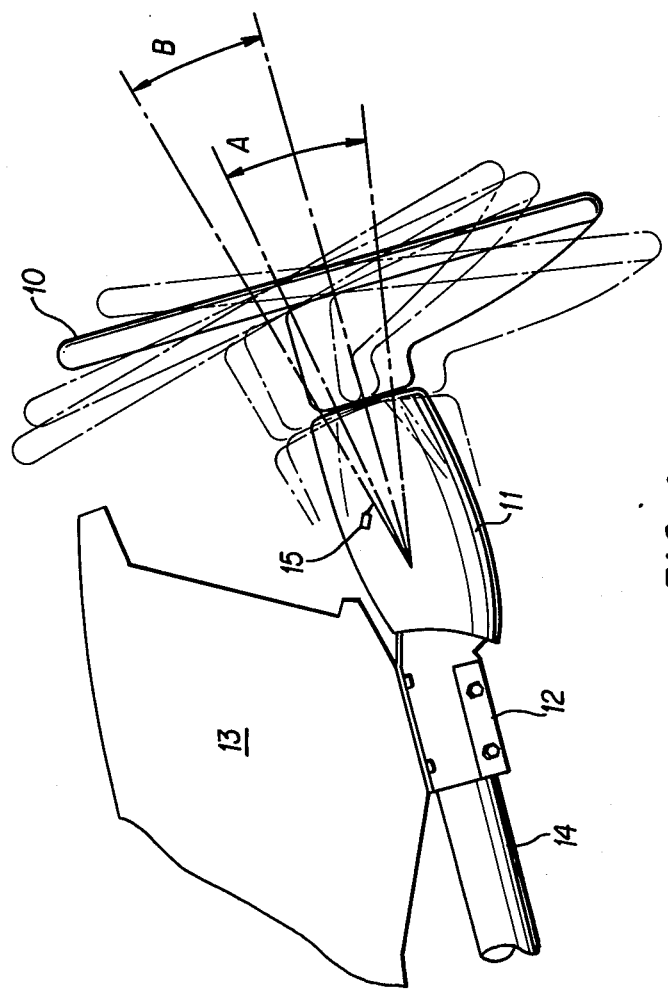
FIG. 1 is an explanatory elevational view which shows a preferred embodiment of a tiltable steering apparatus for vehicles according to the present invention.

Referring now to FIG. 1, reference numeral 10 denotes a steering wheel and 11 indicates a column portion. A break away bracket 12 is fixed to a dash board 13 and a column tube 14 is operatively connected to a gear box (not shown). Reference letter A denotes the tilt angle of the steering wheel 10 and B indicates a tilt away angle of the column portion 11 thereof. Reference numeral 15 denotes an operating lever.

Figure 4:
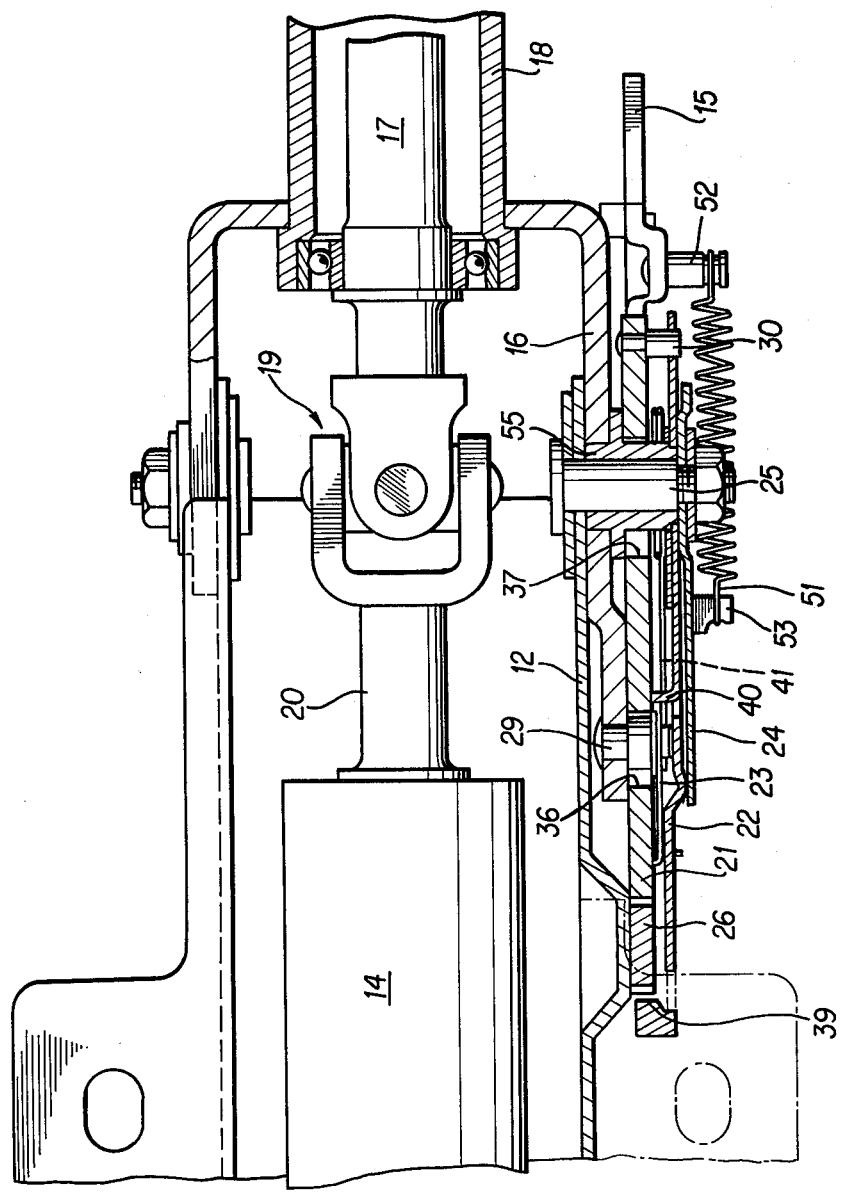
FIG. 4 is a similar view to FIG. 3, however, taken along line IV—IV in FIG. 2.

In FIGS. 2, 3, and 4, reference numeral 16 denotes a column bracket fixed to a housing 18 of a steering shaft 17 at one end thereof. Steering shaft 17 is operatively connected to a steering shaft 20 through a joint 19. Reference numeral 21 indicates a pawl member, reference numeral 22 shows a memory member while 23 denotes a regulating member, reference numeral 24 is a depressing plate fixed to the break-away bracket 12, and a pin 25 is inserted thereinto. Reference numeral 26 indicates a latch member fixed to the break-away bracket 12 and is provided with a plurality of inner and outer teeth 27, 28.

A pin 29 is fixed to the other end of column bracket 16. A pin 30 is mounted on one end of the pawl member 21 and is inserted into an arch shaped slot 31 provided on one end of the memory member 22 at the center of the pin 25. A hook portion 33 engageable with a hook portion 32 is provided on one end of the operating lever 15, and a cam face 35 engageable with a cam face 34 formed on an outer periphery of the hook portion 33 of the operating lever 15 is provided on a right end of the pawl member 21. Pawl member 21 is provided with two slots 36, 37. Pin 29 of the column bracket 16 and the pin 25 thereof are inserted into the slots 36, 37, respectively.

A toothed portion 38 is provided on the other end of the pawl member 21 and is engageable with the inner teeth 27 of the latch member 26 by leftwardly displacing the pawl member 21 according to the engagement of the cam face 34 of the hook portion 33 of the operating lever 15 and the cam face 35 of the pawl member 21. Memory member 22 is provided with a nail portion 39 at the other end thereof which is engageable with the outer teeth 28 of the latch member 26 by engaging hook portion 33 of the operation level 15 with hook portion 32 of the pawl member 21 and rightwardly displacing memory member 22 through the pin 30 of the pawl member 21 and the arch shaped slot 31 of the memory member 22 in FIG. 2. Memory member 22 is provided with a flanged portion 40 at the central portion thereof.

Reference numeral 41 denotes a torsion spring which includes two arm portions 42, 43 and a central portion 44. Both inside edge portions of the arm portions 42 and 43 are engaged with the pin 29 in the state shown in FIG. 2 and with the flanged portion 40 of the memory member 22.

The central portion 44 of the torsion spring 41 is wound on the pin 25. Regulating member 23 is provided with first and second engaging pieces 45, 46 and a rimmed portion 47. First engaging piece 45 of the regulating member 23 is engaged with an engaging portion 48 of the pawl member 21 and can regulate the leftward displacement of the pawl member 21 in FIG. 2, and the second engaging piece 46 thereof is contacted with a contacting portion 49 of the left lower side of the memory member 22 and can release from engagement the engaging portion 48 of the pawl member 21 and the first engaging piece 45 of the regulating member 23. The rimmed portion 47 thereof is engageable with a recessed portion 50 provided on a rearward portion of the pawl member 21.

Reference numeral 51 indicates a spring, one end of which is engaged with a pin 52 of the operating lever 15 with the other end engaged with the flanged portion 53 of the depressing plate 24. The operating lever 15 is rotatably supported on the column bracket 16 by a pin 54 and is biased in a counterclockwise direction around the pin 54 by the spring 51. Namely, the cam face 34 of the hook portion 32 of the operating lever is biased in the engaging direction with the cam face 35 of the pawl member 21 by the spring 51. Reference numeral 55 is a bushing.

Figure 5:
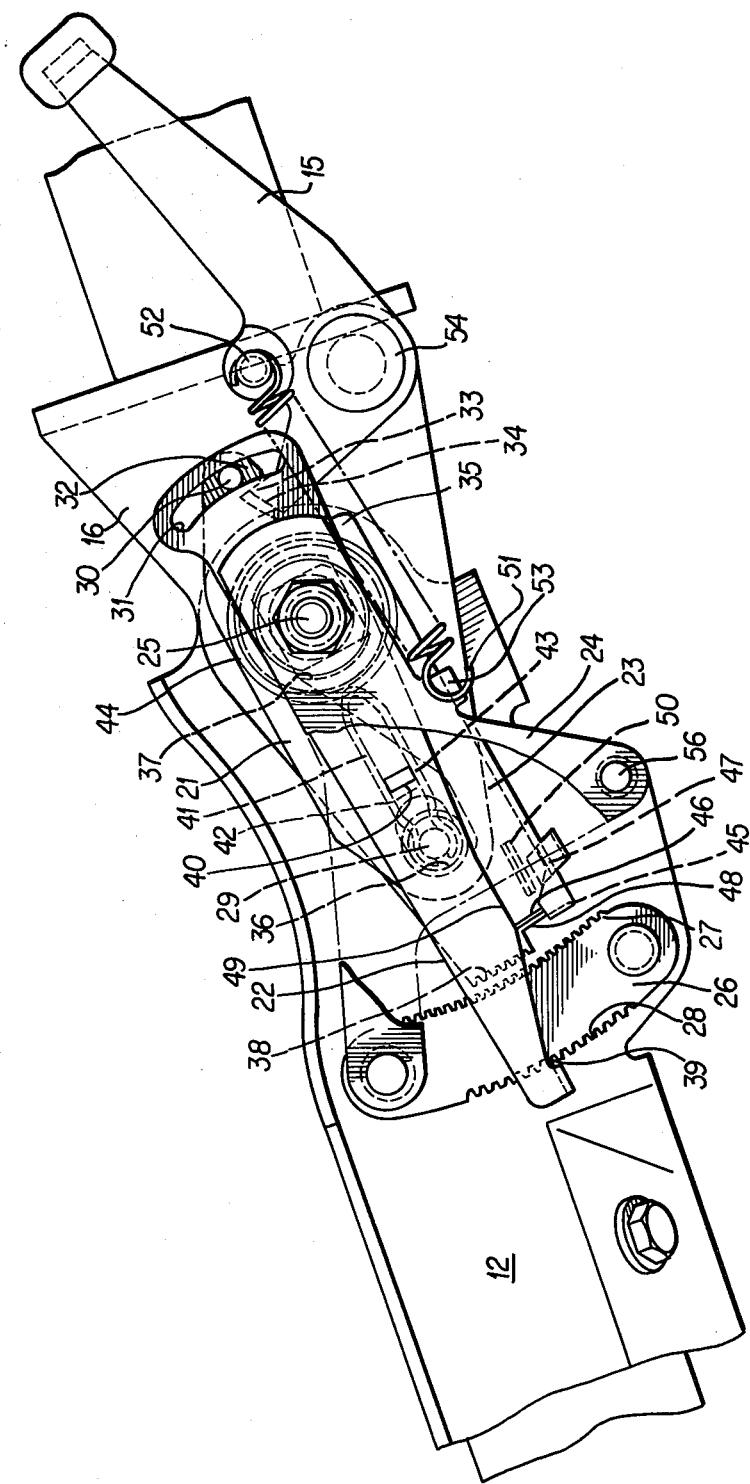
FIGS. 5, 6 and 7 are views similar to FIG. 1 and show actuation of the tiltable steering apparatus of the present invention.

Operation of the present invention is as set forth hereinafter. When the operating lever 15 is rotated in the clockwise direction around the pin 54 against the urging force of the spring 51 in FIG. 2 in order to titably regulate the steering wheel 10 to a desired position of the driver, the cam face 34 of the hook portion 33 of the operating lever 15 is released from the cam face 35 of the pawl member 21 and the hook portion 33 of the operating lever 15 is engaged with the hook portion 32 of the pawl member 21. Accordingly, the pawl member 21 is displaced rightwardly in FIG. 2 and the toothed portion 38 of the pawl member 21 is released from the inner teeth 27 of the latch member 26. Memory member 22 is also rightwardly displaced through the pin 30 in FIG. 2 engaging the arch shaped slot 31 of the memory member 22 and the nail portion 39 of the memory member 22 is engaged with the outer teeth 28 of the latch member 26 (FIG. 5). Further, when the operating lever 15 is rotated in the counterclockwise direction around the pin 54 in the state of FIG. 5, after the steering wheel 10 is regulated to a desired position of the driver around the pin 25 in the state of FIG. 5, the hook portion 33 of the operating lever 15 is released from the hook portion 32 of the pawl member 21 and the cam face 34 of the hook portion 33 of the operating lever 15 is engaged with the cam face 35 of the pawl member. Therefore, pawl member 21 is displaced leftwardly in FIG. 5 and the toothed portion 38 of the pawl member 21 is engaged with the inner teeth 27 of the latch 26. Memory member 22 is leftwardly displaced through the pin 30 and the arch shaped slot 31 of the memory member 22 in FIG. 5 and the nail portion 39 of the memory member 22 is released from the outer teeth 28 of the latch 26.

Figure 6:
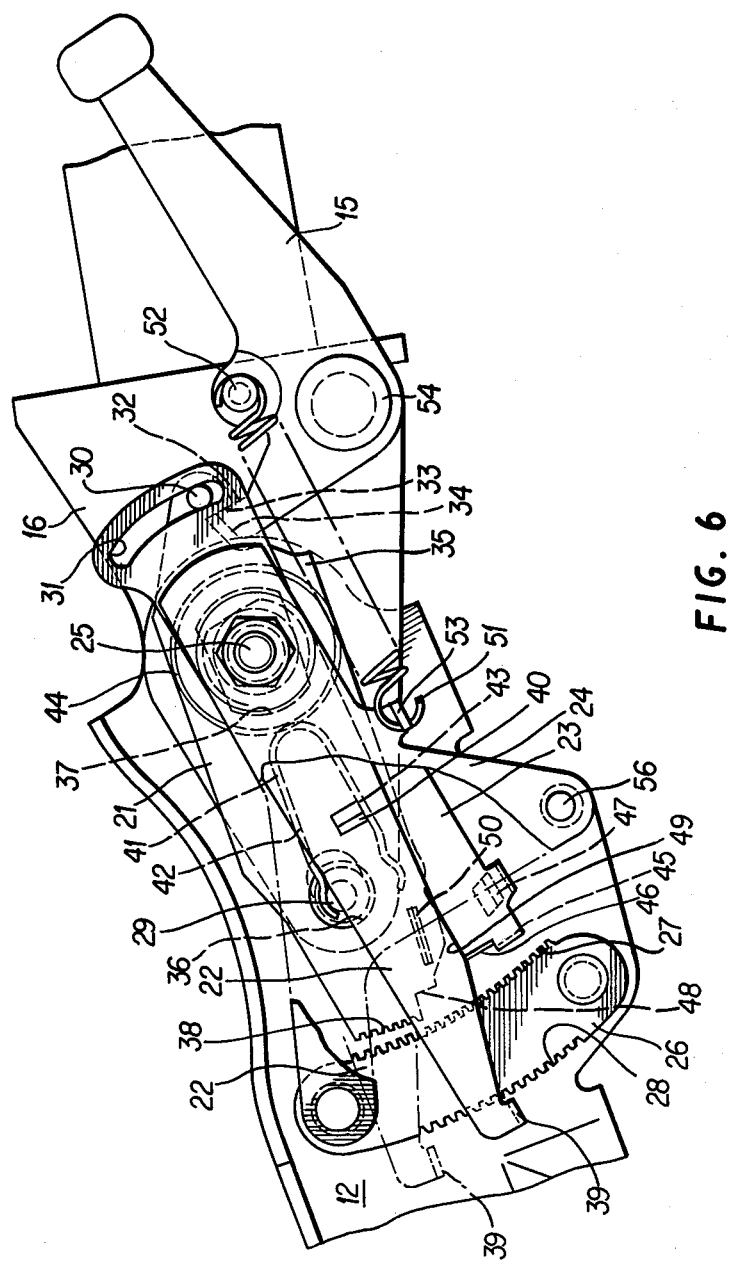

Arm portion 42 of the torsion spring 41 is upwardly expanded through the pin 29 of the column bracket 16 by the downwardly rotation of the column bracket around the pin 25 with tiltable regulation of the steering wheel 10, however, the biasing force of the arm portion 43 of the torsion spring 41 acts on the flanged portion 40 of the memory member 22. So, as soon as the memory member 22 is leftwardly displaced through the pin 30 of the pawl member 21 and the arch shaped slot 31 of the memory member 22 is released from the outer teeth 28 of the latch, after the steering wheel 10 is regulated, the memory member 22 is rotated to the position indicated by the chain and dotted line, until the inner end of the arm portion 42 of the torsion spring 41 is engaged with the pin 29 of the column bracket 16 in FIG. 6, thereby attaining tiltable regulation of the steering wheel 10.

Figure 7:
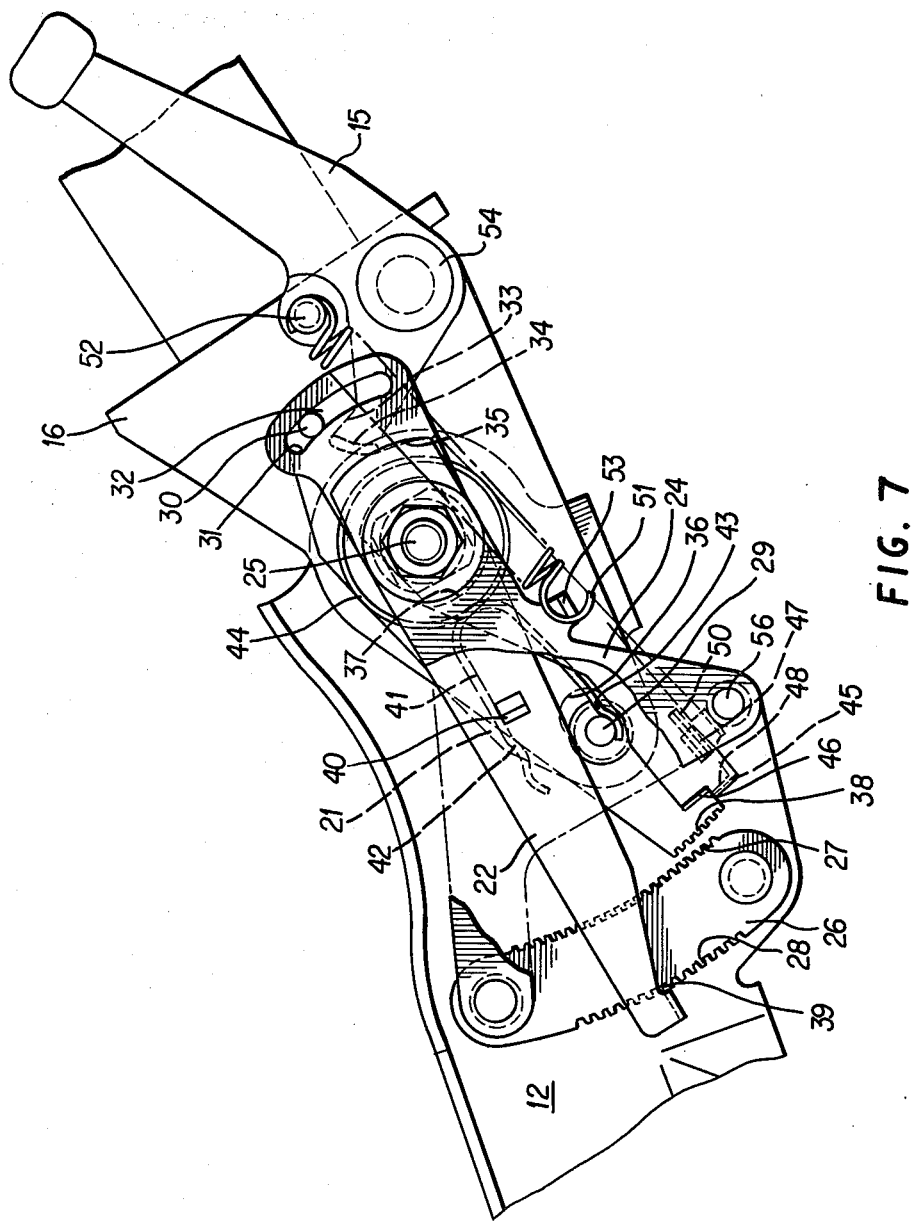

When the operating lever 15 is rotated in the clockwise direction against the urging force of the spring 51 around the pin 54 in FIG. 2 in order to attain the tilt-away operation of the steering wheel 10 for easy access in FIG. 1, the cam face 34 of the hook portion 33 of the operating lever 15 is released from the cam face 35 of the pawl member 21 and the hook portion 33 of the operating lever 15 is engaged with the hook portion 32 of the pawl member 21. Accordingly, the pawl member 21 is displaced rightwardly in FIG. 2 and the toothed portion 38 of the pawl member 21 is released from the inner teeth 27 of the latch member 26. Memory member 22 is also moved rightwardly through the pin 30 and the arch shaped slot 31 of the pawl member 21 in FIG. 2 and the nail portion 39 of the memory member 22 is engaged with the outer teeth 28 of the latch member 26 (FIG. 5). Further, when the steering wheel 10 is lifted upwardly in the state of FIG. 5, the pin 29 of the column bracket 16 expands the arm portion 43 of the torsion spring 41 downwardly as shown in FIG. 7 and the pawl member 21 is rotated in the counterclockwise direction around the pin 25 through the slot 37 as shown in FIG. 7. At this time, the pin 30 of the pawl member 21 is displaced in the upward position of the arch shaped slot 31 of the memory member 22 (FIG. 7). Engaging portion 48 of the pawl member 21 is engaged with the first engaging piece 45 of the regulating member 23 and the outer end of the rimmed portion 47 of the regulating member 23 is contacted with the pin 56 of the depressing plate 24. When the pawl member 21 is further rotated in the counterclockwise direction, the rimmed portion 47 of the regulating member 23 is engaged with the recessed portion 50 of the pawl member 21 by the pin 56 of the depressing plate 24. Accordingly, since the engaging portion 48 of the pawl member 21 is engaged with the first engaging piece 45 of the regulating member 23 in FIG. 7, the pawl member 21 can not be displaced leftwardly. At this time, the nail portion 39 of the memory member 22 is maintained in an engaged state with the outer teeth 28 of the latch member 26, thereby attaining tilt-away operation of the steering wheel 10.

The memory function for memorizing the tiltable regulating position before the tilt-away operation, after the tilt-away operation of the steering wheel 10, is as set forth hereinafter. When the steering wheel 10, that is, the column bracket 16 is rotated in the clockwise direction in FIG. 7, after the tilt-away operation of the steering wheel 10, the nail portion 39 of the memory member 22 is maintained in an engaging state with the outer teeth 28 of the latch member 26, and the pawl member 21 and the regulating member 23 are simultaneously rotated in the clockwise direction around the pin 25 by the pin 29 of the column bracket 16. The engaging piece 46 of the regulating member 23 is contacted with the contacting portion 49 of the memory member 22 by the rotation of the pawl member 21 and the regulating member 23, however, the pawl member 21 is further rotated in the clockwise direction. Accordingly the hook portion 33 of the operating lever 15 is released from the hook portion 32 of the pawl member 21 by the biasing force of the spring 51 and the cam face 34 of the hook portion 33 of the operating lever 15 is engaged with the cam face 35 of the pawl member 21, so that the pawl member 21 is displaced leftwardly in FIG. 2 and the toothed portion 38 of the pawl member 21 is engaged with the inner teeth 27 of the latch member 26 and the memory member 22 is displaced leftwardly through the pin 30 and the arch shaped slot 31 of the pawl member 21 in FIG. 2. The nail portion 39 of the memory member 22 is then released from the outer teeth 28 of the latch member 26 (FIG. 2), thereby attaining the memory function for memorizing the regulating position before the tilt-away operation of the steering wheel 10.

By the foregoing, there has been disclosed a preferred form of a tiltable steering apparatus for vehicles constructed in accordance with the present invention. It will be appreciated that various additions, substitutions, modifications and omissions may be made thereto without departing from the spirit of this invention.

What is claimed as new and desired to be secured by Letters Patent of the United States is:

1. A tiltable steering apparatus for vehicles for tiltably regulating a steering wheel by engagement of a pawl member and a latch member according to operation of an operating lever, comprising:
   a memory engaged with said latch member and releasable from said latch member upon engagement of said latch member with said pawl member and engageable with said latch member upon disengagement of said latch member from said pawl member according to rotation of said operating lever;
   a regulating means engageable with said pawl member upon release of said pawl member from said latch member and disengageable from said pawl member at an engagement position of said memory means with said latch member so as to engage said pawl member with said latch member at said engagement position; and
   means for acting on said memory means for releasing said pawl member from said latch member and for moving said memory means with respect to said pawl member.

2. A tiltable steering apparatus for vehicles as set forth in claim 1, wherein said acting means further comprises a torsion spring engaged with said memory means.

3. A tiltable steering apparatus for vehicles as set forth in claim 1, wherein said memory means further comprises a nail member engageable with said latch member.

4. A tiltable steering apparatus for vehicles as set forth in claim 2, wherein said torsion spring further comprises a plurality of arm members and a central member.

5. A tiltable steering apparatus for vehicles as set forth in claim 2, wherein said torsion spring further comprises means for rotating said memory means to a regulated position determined by tiltably regulating said steering wheel such that when said steering wheel is tiltably regulated, said memory means rotates to said regulated position and engages said latch member.

* * * * *